J. W. HASBURG.
PAINT PACKAGE.
APPLICATION FILED JUNE 10, 1921.
1,427,290.
Patented Aug. 29, 1922.
2 SHEETS—SHEET 1.
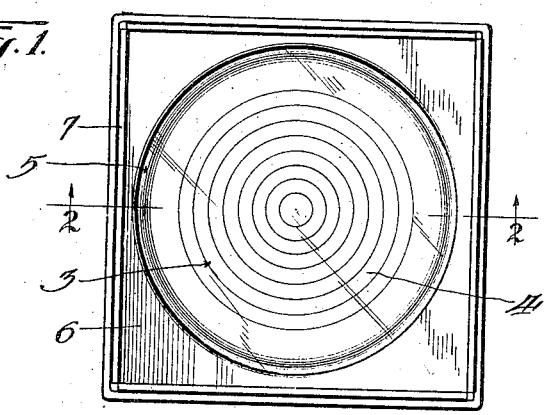
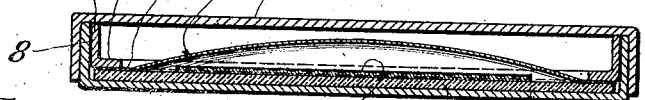
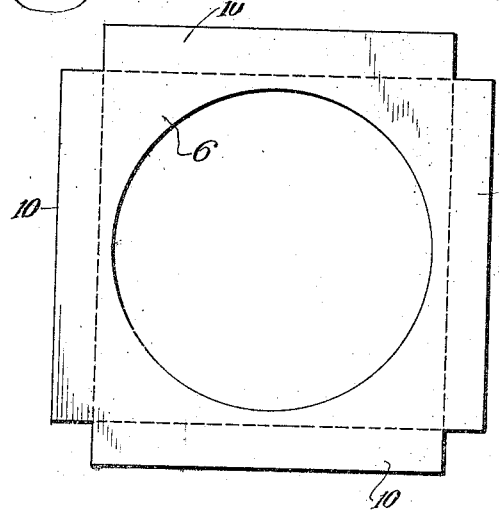
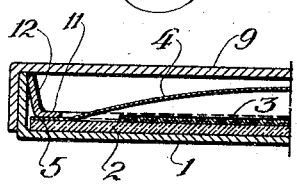
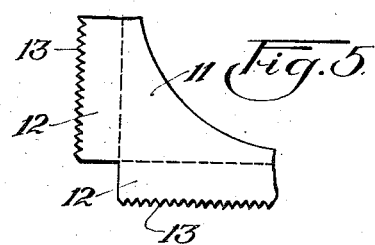
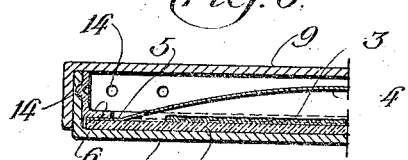
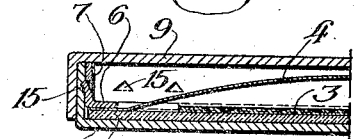
Inventor:
John W. Hasburg
By Chamberlin Brandenreich
Attys.

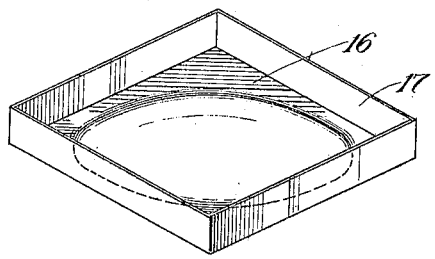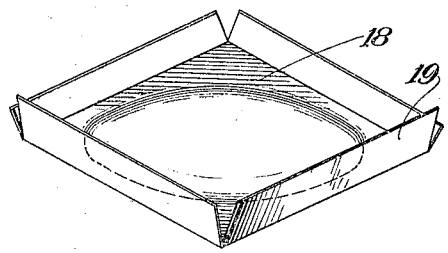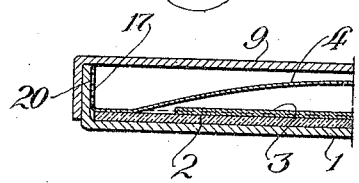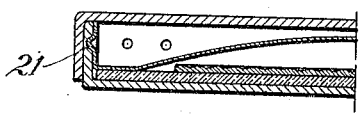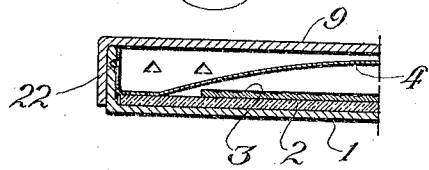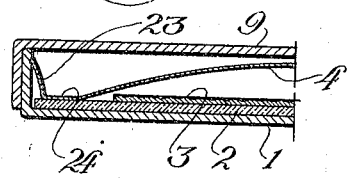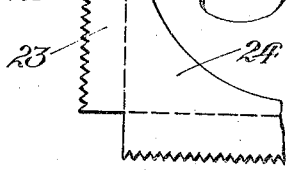

UNITED STATES PATENT OFFICE.

JOHN W. HASBURG, OF CHICAGO, ILLINOIS.

PAINT PACKAGE.

1,427,290. Specification of Letters Patent. Patented Aug. 29, 1922.

Application filed June 10, 1921. Serial No. 476,407.

*To all whom it may concern:*

Be it known that I, JOHN W. HASBURG, a citizen of the United States, residing at Chicago, county of Cook, State of Illinois, have invented a certain new and useful Improvement in Paint Packages, and declare the following to be a full, clear, and exact description of the same, such as will enable others skilled in the art to which it pertains to make and use the same, reference being had to the accompanying drawings, which form a part of this specification.

My invention has for its object to produce a simple and novel construction and arrangement in a package for containing small quantities of paint of high intrinsic value, whereby the paint will practically be sealed so as to be protected against dust and other foreign matter even after the lid or closure has been opened or removed to expose the paint to view through the transparent wall of an enclosing chamber.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a plan view of a package arranged in accordance with one form of my invention, the lid or closure being removed;

Fig. 2 is a section on a somewhat larger scale, taken approximately on line 2—2 of Fig. 1;

Fig. 3 is a plan view of the follower used in the package shown in Figs. 1 and 2, prior to bending up the flanges on the follower;

Fig. 4 is a view similar to Fig. 2, illustrating a modified arrangement, only one-half of the package being shown;

Fig. 5 is a plan view of one corner of the blank form which the follower employed in Fig. 4 is made;

Fig. 6 is a view similar to Fig. 4 showing a further modification;

Fig. 7 is a view similar to Figs. 4 and 6 showing a still further modification;

Fig. 8 is a perspective view of the transparent celluloid cover employed in a package in which the follower is omitted;

Fig. 9 is a perspective view of a modified form of celluloid cover;

Fig. 10 is a view similar to Figs. 4, 6 and 7 showing an arrangement in which the follower is omitted;

Figs. 11, 12 and 13 are views similar to Fig. 10 showing further modifications having no followers; and Fig. 14 is a plan view of one corner of the blank from which the celluloid cover in Fig. 13 is made.

Referring to Figs. 1 and 2 of the drawings, 1 represents a flat shallow box within which lies a palette, 2, of glass upon which is spread a thin wafer-like mass, 3, of paint. Lying upon the palette is a transparent cover preferably of celluloid, comprising a flat dome-shaped central portion, 4, somewhat larger in diameter than the paint wafer, and a flat marginal portion, 5, which rests upon the palette beyond the periphery of the wafer. Upon the flat marginal portion of the cover lies a follower, 6, having at the edges flanges 7, engaging with the sides of the box. A layer, 8, of suitable adhesive material is placed between the flanges of the follower and the sides of the box so that the follower is positively held in a position in which the marginal portions of the palette and cover are clamped between the follower and the bottom of the box. The open top of the box is closed by a suitable lid, 9.

It will be seen that the seal of the paint-containing chamber is not broken when the lid of the box is removed, so that the box may be opened and closed at will without danger of permitting dust or other foreign matter to enter the paint chamber.

The follower may be made in the form of a flat tray or it may be made as shown in Fig. 3, out of a flat piece having a central opening large enough to permit the dome-shaped portion of the cover to project through the same and having at the four edges flaps or flanges, 10, adapted to be bent at right angles to the body of the follower. If the flanges are not bent up into their final positions until just before a package is made up, the natural resiliency of the cardboard from which the follower will usually be made, will cause the flanges to press against the sides of the box; thus holding the follower in place by means of friction. Glue may also be used between the flanges of this form of follower and the sides of the box.

In Fig. 4 I have shown an arrangement which is the same as that shown in Fig. 2 except that the follower, 11, constitutes a modification of the follower shown in Fig. 3. The follower, 11, as best shown in Fig. 5, has flanges, 12, at the edges, and the outer edges of these flanges are serrated as shown at 13. These serrations, due to the natural spring or resiliency of the material of which the follower is made, will be pressed laterally against the walls of the box and will bite into the material of the walls more or less and thus serve positively to hold the follower down on the cover.

In Fig. 6 the follower is the same as that shown in Fig. 1, but is held positively in place by punching small bosses or projections, 14, outwardly through the flanges thereof into the walls of the box. These bosses or projections may be formed with any suitable punch after the follower has been placed in the box.

In Fig. 7 the arrangement is substantially the same as that in Fig. 6 except that interlocking projections are not formed by simply pressing the material of the flanges of the follower outwardly but by cutting the flanges of the followers in a manner to form small tongues, 15, preferably triangular in shape which are forced outwardly into the material of which the walls of the box are made.

In some cases I may dispense with the followers, so shaping the celluloid cover that it may be secured to or interlocked with the sides of the box in any of the different ways in which the follower in Figs. 1 to 7 is secured in place. In Fig. 8 I have shown the celluloid cover, 16, having flanges, 17, at the edges to give the cover the shape of a shallow tray. In Fig. 9 I have shown a cover, 18, provided with flanges, 19, that in the blank lie in the same plane as the flat marginal portions of the cover and, when bent upwardly to produce a tray-like formation, tend to flatten out and will thus press laterally at their upper edges against the inner sides of the walls of the box. In Fig. 10 I have illustrated a package having no follower but in which a cover such as shown in Fig. 8, has its flanges or sides secured to the walls of the box by a layer, 20, of adhesive material.

In Fig. 11 the package is similar to that shown in Fig. 6 except that the follower is omitted and the cover takes the form shown in Fig. 8; the interlocking projections, 21, corresponding to the bosses or projections, 14, in Fig. 6, being punched from the flanges of the cover.

Fig. 12 shows an arrangement corresponding to that in Fig. 7 with the follower omitted; the tongues, 22, corresponding to the tongues, 15, in Fig. 7 being punched out of the follower.

Fig. 13 shows an arrangement similar to that illustrated in Fig. 4, with the follower omitted, the flanges, 23, at the edges of the follower 24 being serrated along their edges as indicated at 25 in Fig. 14; these serrations biting into the sides of the box and holding the cover firmly against the palette.

It will thus be seen that I have produced a simple and novel package in which the seal between the palette and its covering means is positively maintained, the seal remaining unbroken after the lid or closure for the box which forms the outer element of the package is removed.

I claim:

1. A package comprising a box open at the top, a palette lying in the bottom of the box; covering means for the palette including a shallow transparent dome-like central part, a part resting on the marginal portions of the palette, and upwardly-directed flanges or walls secured to the inner face of the sides of the box; and a lid for said box.

2. A package comprising a box open at the top, a palette lying in the bottom of the box; covering means for said palette including a central shallow dome-like transparent part, parts lying upon the marginal portions of the palette, and upwardly-extending flanges or walls engaging with the sides of the box; means co-operating with said flanges or walls and the inner face of the sides of the box to hold the aforesaid means positively upon the palette, and a lid for said box.

3. A package comprising a box open at the top, a palette lying in the bottom of the box; covering means for the palette including a shallow dome-like central part, a part resting on the marginal portions of the palette, and upwardly-directed flanges or walls secured to the inner face of the sides of the box; and a lid for said box.

In testimony whereof, I sign this specification.

JOHN W. HASBURG.